(12) United States Patent
Kimura et al.

(10) Patent No.: US 8,690,221 B2
(45) Date of Patent: Apr. 8, 2014

(54) WORKING VEHICLE

(71) Applicant: Mitsubishi Agricultural Machinery Co., Ltd., Matsue (JP)

(72) Inventors: Shigeharu Kimura, Matsue (JP); Yuzuru Tsukahara, Matsue (JP); Shinji Ohmi, Matsue (JP)

(73) Assignee: Mitsubishi Agricultural Machinery Co., Ltd., Matsue (JP)

( * ) Notice: Subject to any disclaimer, the term of this patent is extended or adjusted under 35 U.S.C. 154(b) by 0 days.

(21) Appl. No.: 13/750,024

(22) Filed: Jan. 25, 2013

(65) Prior Publication Data
US 2013/0193710 A1 Aug. 1, 2013

(30) Foreign Application Priority Data

Jan. 30, 2012 (JP) ................ 2012-017008
Jan. 30, 2012 (JP) ................ 2012-017009
Jul. 5, 2012 (JP) ................ 2012-151856

(51) Int. Cl.
*B60N 2/02* (2006.01)

(52) U.S. Cl.
USPC ................. 296/65.06; 297/344.21

(58) Field of Classification Search
USPC ........... 296/65.06; 297/344.1, 344.21, 342.22
See application file for complete search history.

(56) References Cited

U.S. PATENT DOCUMENTS

| 4,792,188 | A | * | 12/1988 | Kawashima | ............ 297/344.26 |
| 8,210,613 | B2 | * | 7/2012 | Adelsperger et al. | ..... 297/344.22 |
| 2010/0072801 | A1 | * | 3/2010 | Adelsperger et al. | ..... 297/344.21 |
| 2010/0253123 | A1 | * | 10/2010 | DeCraene et al. | ........ 297/344.22 |
| 2011/0109135 | A1 | * | 5/2011 | Davis et al. | ................ 297/217.4 |

FOREIGN PATENT DOCUMENTS

JP 3808729 5/2006

* cited by examiner

*Primary Examiner* — Lori Lyjak
(74) *Attorney, Agent, or Firm* — Wenderoth, Lind & Ponack, LLP.

(57) ABSTRACT

Front end sides of seat brackets and seat frames are connected with each other turnably by an arm member, an inclined plate is provided at a rear end of the seat frames, and rollers are disposed at a rear end of the seat brackets. The rollers move on the inclined plate as the seat brackets move between a front lower position and a rear upper position.

6 Claims, 9 Drawing Sheets

WORKING VEHICLE

BACKGROUND OF THE INVENTION

1. Field of the Invention

The present invention relates to a working vehicle including a seat which configured to be rotatable such that the seat faces in front and back direction of the vehicle.

2. Description of Related Art

A working vehicle such as a tractor is attached with working implements such as a front loader and a backhoe in general. Because the backhoe is attached at a rear part of the body, i.e., on a rear side of a seat, an operator is required to turn to the rear side, opposite from a normal driving direction, when the operator operates the backhoe. Still further, because an operating tool for operating the backhoe is positioned at level higher than a driving operating tool such as a steering wheel, the operator is required to operate the backhoe at the level higher than the level in driving the tractor.

Hitherto, for the tractor attached with the backhoe at the rear part of the body, Japanese Patent No. 3808729 discloses a seat turning and supporting unit that turns the seat forward in driving the tractor and turns the seat backward and heightens the level thereof in operating the backhoe. The seat turning and supporting unit includes a swivel base that turnably supports the seat, a support base fixed to the body of the tractor, and a link mechanism connecting the swivel base with the support base.

The link mechanism includes front and rear link members. The seat turning and supporting unit is arranged such that the unit changes positions of the seat from a tractor driving position to a backhoe operating position by erecting the link members that have been fallen forward and by turning the seat supported by the swivel base from a front-facing position to a back-facing position.

Because the turning and supporting unit is arranged such the unit changes the positions of the seat by moving the link members that support the front and rear parts of the swivel base, it is necessary to assure a space for the link members and for allowing the link members to be movable. Therefore, a degree of freedom for actively utilizing the space around the seat, e.g., a space for disposing cylinder for lifting the working implement, is limited.

SUMMARY OF THE INVENTION

The present invention provides a working vehicle including a body, a seat bracket, a seat frame fixed to the body, an arm member connected such that a lower end thereof is turnably connected to a front end side of the seat frame and an upper end thereof is turnably connected to a front end side of the seat bracket, an inclined plate provided at a rear end side of the seat frame and inclined obliquely upward in a rear direction, a roller disposed at a rear end portion of the seat bracket and movable on the inclined plate, a seat being mounted on the seat bracket, and the seat supported movably between a front lower position in which the arm member falls forward and the roller moves to a lower position of the inclined plate and a rear upper position in which the arm member erects upward and the roller moves to an upper position of the inclined plate, and being held in the front lower position or the rear upper position, and a swivel mechanism configured to support the seat rotatably such that the seat faces in front and back directions of the vehicle.

Further features of the present invention will become apparent from the following description of exemplary embodiments with reference to the attached drawings.

DESCRIPTION OF THE EMBODIMENTS

Figure 1:
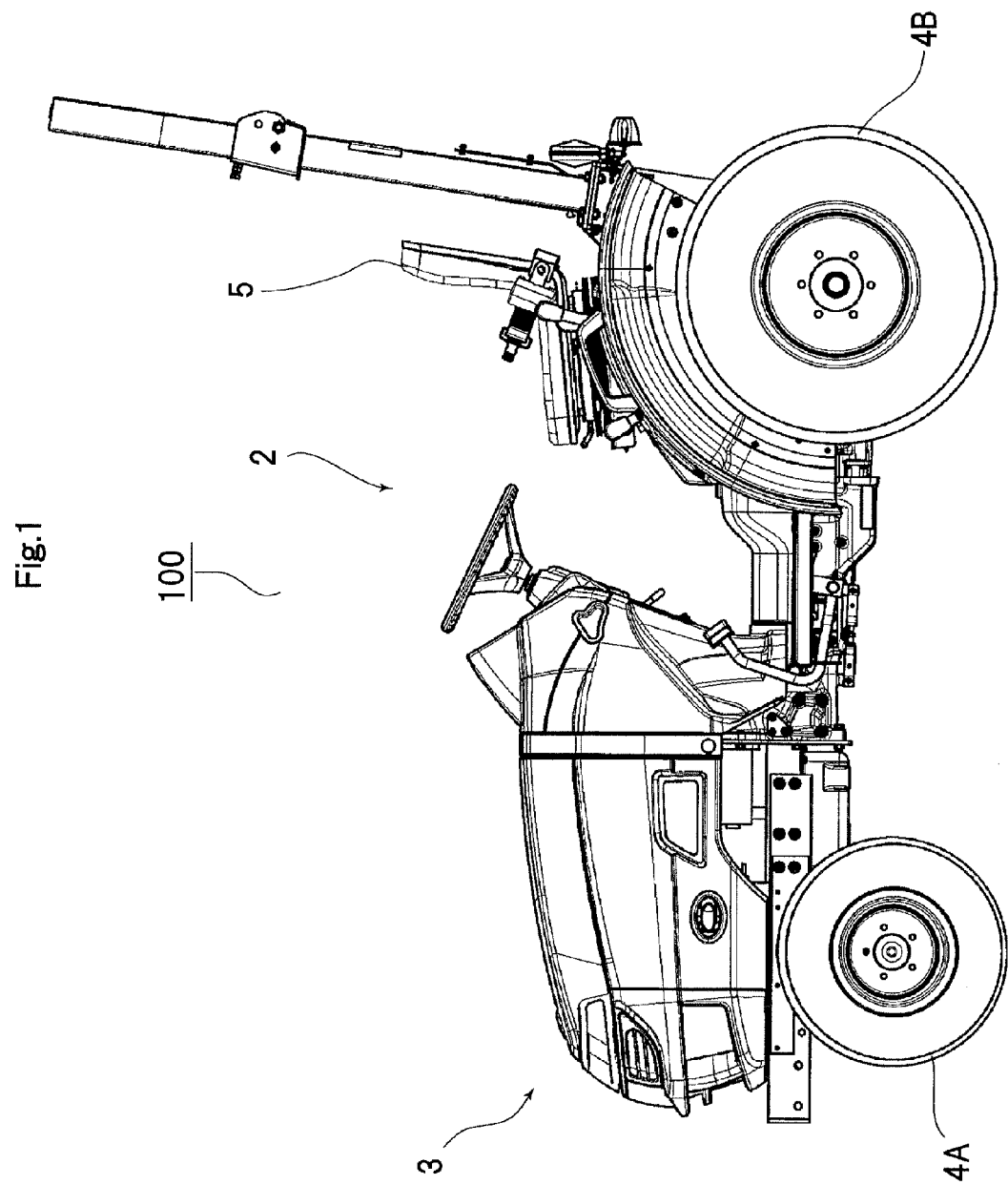
FIG. 1 is an overall view of a working vehicle of an embodiment of the invention.
Figure 2:
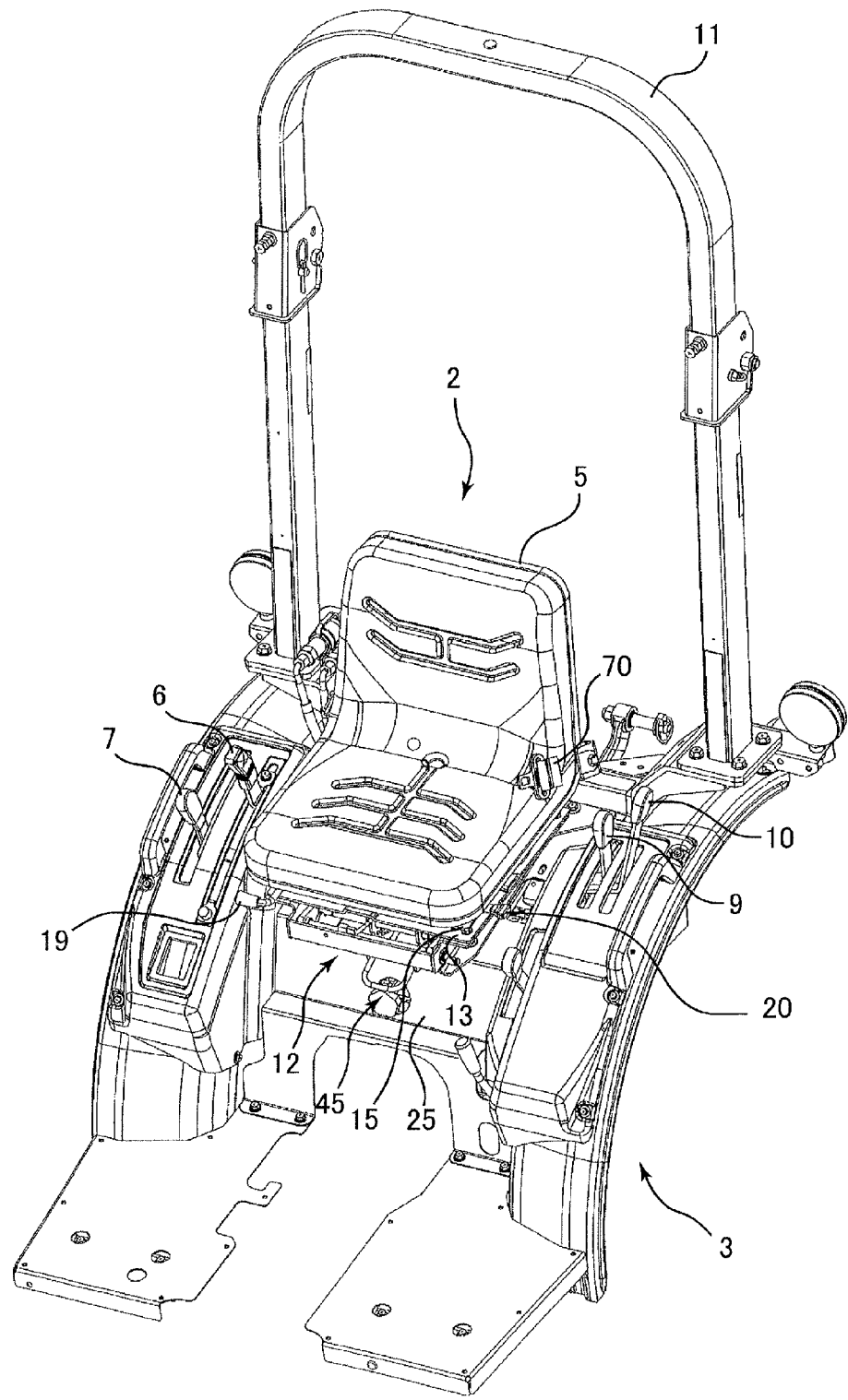
FIG. 2 is a perspective view showing a state in which a seat of the embodiment of the invention faces in a front side of the vehicle.
Figure 3:
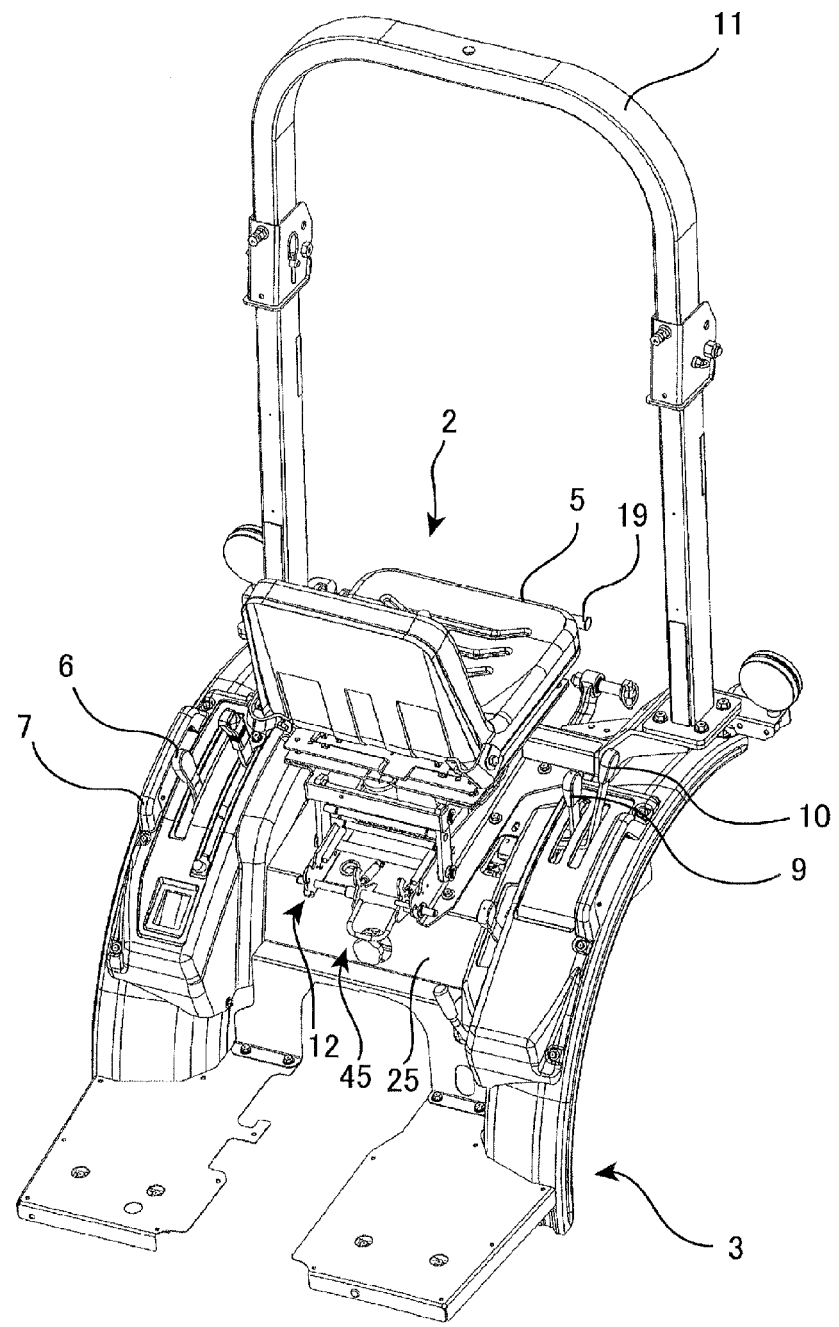
FIG. 3 is a perspective view showing a state in which the seat is turned and is facing in a rear side of the vehicle.

An embodiment of the invention applied to a tractor as a working vehicle will be explained below. The tractor 100 has an operating section 2 as shown in FIGS. 1 to 3. The operating section 2 includes a seat (driver's seat) 5 disposed on a travel body (vehicle body) 3 supported by front and rear wheels 4A, 4B. A front loader not shown is disposed in a front part of the travel body 3 and a backhoe not shown is disposed on a rear part of the travel body 3. The tractor 100 is arranged such that an operator drives the tractor 100 and operates the front loader while setting the seat 5 at a front-facing position and operates the backhoe while setting the seat 5 at a back-facing position.

The travel body 3 on right and left parts of the seat 5 is provided with various manipulators (peripheral parts) such as a position control lever 6, an external oil pressure switching lever 7, a rear PTO lever 9, a middle PTO lever 10, and others. A ROPS (rollover protective structure) 11 is also disposed such that it surrounds an upper part of the seat 5 in a condition of being fixed to the travel body 3.

Figure 4:
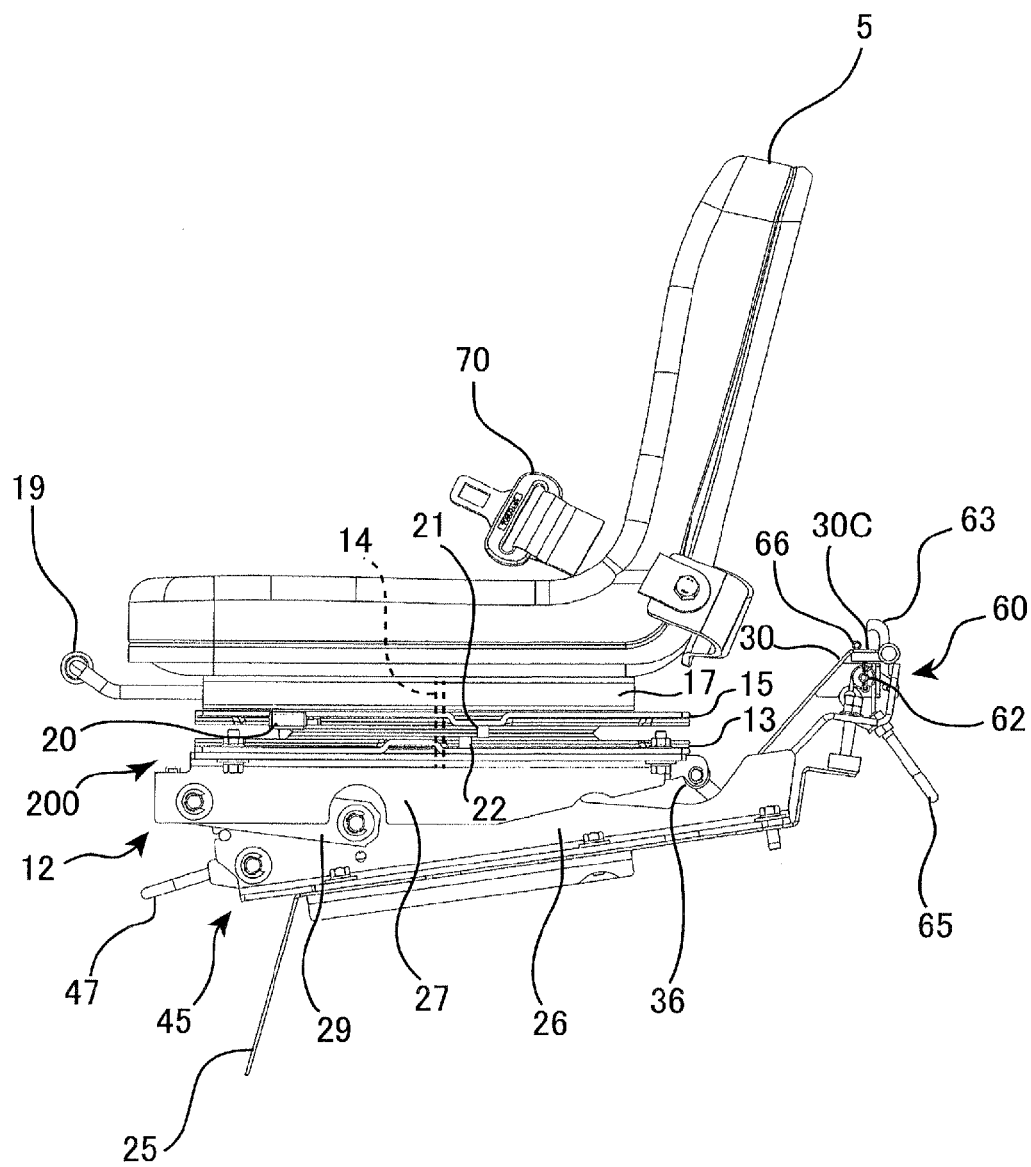
FIG. 4 is a side view showing a supporting unit and a turning mechanism of the seat held at a front lower position of the vehicle.

The seat 5 is supported by a supporting unit 12 described later movably between a front lower position shown in FIG. 2 and a rear upper position shown in FIG. 3. The seat 5 is also disposed on a supporting base 13 fixed to seat brackets 27, i.e., upper frames, of the supporting unit 12 through an intermediary of a swivel base 15 supported rotatably about a vertical shaft 14 as shown in FIG. 4. A guide rail 17 that extends in a front-back direction of the body is disposed between an upper surface of the swivel base 15 and the seat 5, such that the seat 5 is movable in the front-back direction with respect to the swivel base 15 and can be fixed appropriately at a front or back position by a slide lever 19. The swivel base 15 is provided with a rotation unlocking lever (manipulator) 20 that projects in a widthwise direction of the seat, i.e., specifically in a left direction thereof. The unlocking lever 20 allows the seat 5 to be fixed at the front- or back-facing position by manipulating an engaging member not shown by the unlocking lever 20 such that the engaging member engages with a notch provided on the supporting base 13.

The supporting base 13 is provided with upwardly projecting abutting members 22 at two positions, opposite by 180 degrees from each other by interposing the vertical shaft 14, of a peripheral portion of an upper surface of the supporting base 13, and the swivel base 15 is provided with one downwardly projecting restricting member 21 at one position of a peripheral portion of an under surface of the swivel base 15. Then, one position where either one of the two abutting members 22 abuts the one restricting member 21 is arranged to be the front-facing position of the seat 5 and another position where the other one of the two abutting members 22 abuts the one restricting member 21 is arranged to be the back-facing position. Therefore, a rotation range of the seat 5 is restricted to be 180 degrees between the front-facing position and the back-facing position. That is, when the seat 5 is turned from the front-facing position to the back-facing position, the seat 5 is turned counterclockwise when seen from the above, and when the seat 5 is turned from the back-facing position to the front-facing position, the seat 5 is turned clockwise. It is noted that the supporting base 13 may be provided with one restricting member and the swivel base 15 may be provided with two abutting members.

The operator can turn the seat 5 by releasing a lock state in which the seat 5 is blocked from turning by the engagement of the engaging member not shown with the notch by manipulating the unlocking lever 20. The seat 5 is turned in a condition in which the operator gets out of the travel body 3. In general, the operator unlocks the engaging member on the left side of the travel body 3 by manipulating the unlocking lever 20 located at a front left side of the seat 5 such that the front side of the seat 5 turns toward the operator. That is, the seat 5 turns counterclockwise when the seat 5 is in the front-facing position when seen from the above and clockwise when the seat 5 is in the back-facing position. Then, the lock member is locked in the condition in which the seat 5 is positioned in the front-facing position or in the back-facing position as either one of the two abutting members 22 abuts the one restricting member 21. The abutting position of the restricting member with the abutting member coincides with the operating position of the unlocking lever 20 at this time, so that it is possible to readily and steadily control the locking operation even when the locking operation is made to the front-facing position or the back-facing position by the unlocking lever 20.

A swivel mechanism 200 configured to support the seat 5 rotatably such that the seat 5 faces in front and back directions of the vehicle is disposed between the seat and the seat bracket and includes the supporting base 13, the swivel base 15, one restricting member 21, and the abutting members 22.

It is noted that the unlocking lever 20 may be provided such that it projects out to a front face of the seat 5 (in a direction of knees of the operator on the seat surface). This arrangement enables the operator to readily manipulate the seat from the front-facing position to the back-facing position or from the back-facing position to the front-facing position in the condition in which the operator is positioned at an either side of the right and left sides of the travel body 3 to turn the seat 5, as compared to the case when the unlocking lever 20 is disposed such that it projects out to an either side of the right and left sides of the seat surface, by disposing the unlocking lever 20 at the front face or the position very close to the front face of the seat 5.

Figure 5:
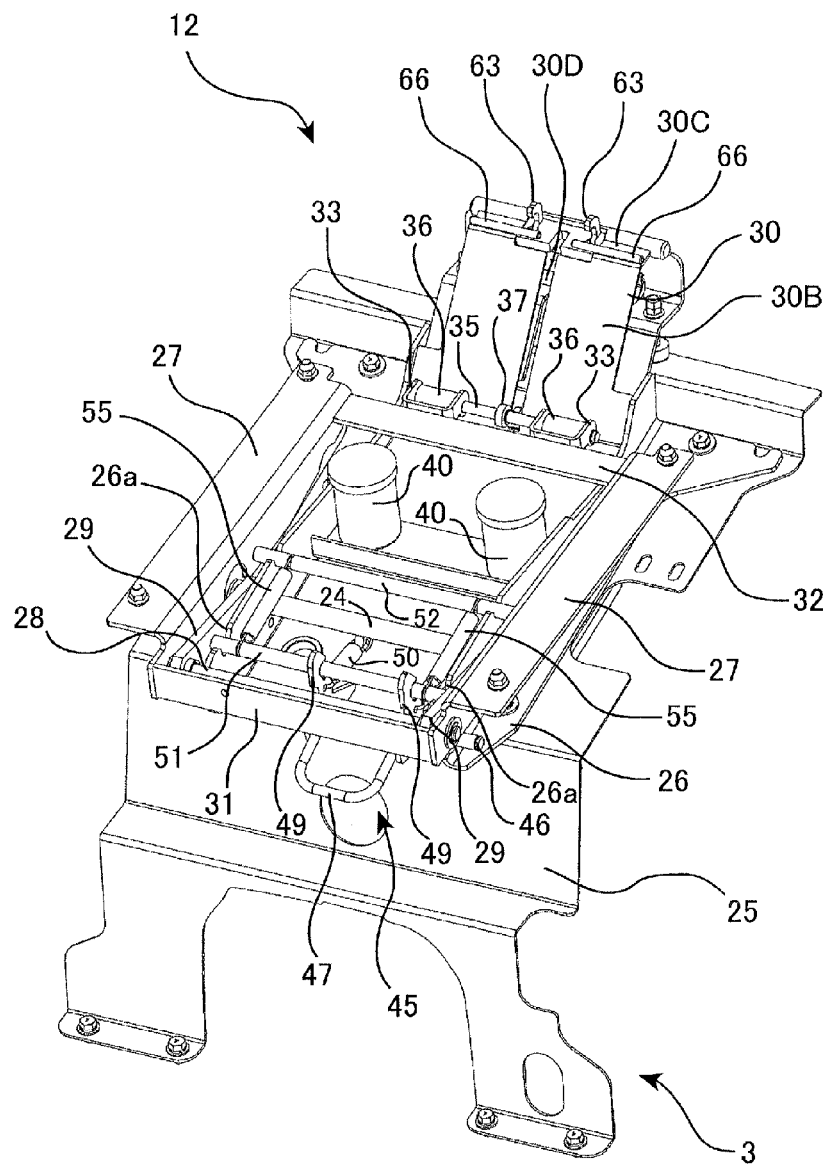
FIG. 5 is a perspective view showing a configuration of the supporting unit of the seat held at the front lower position.
Figure 6:
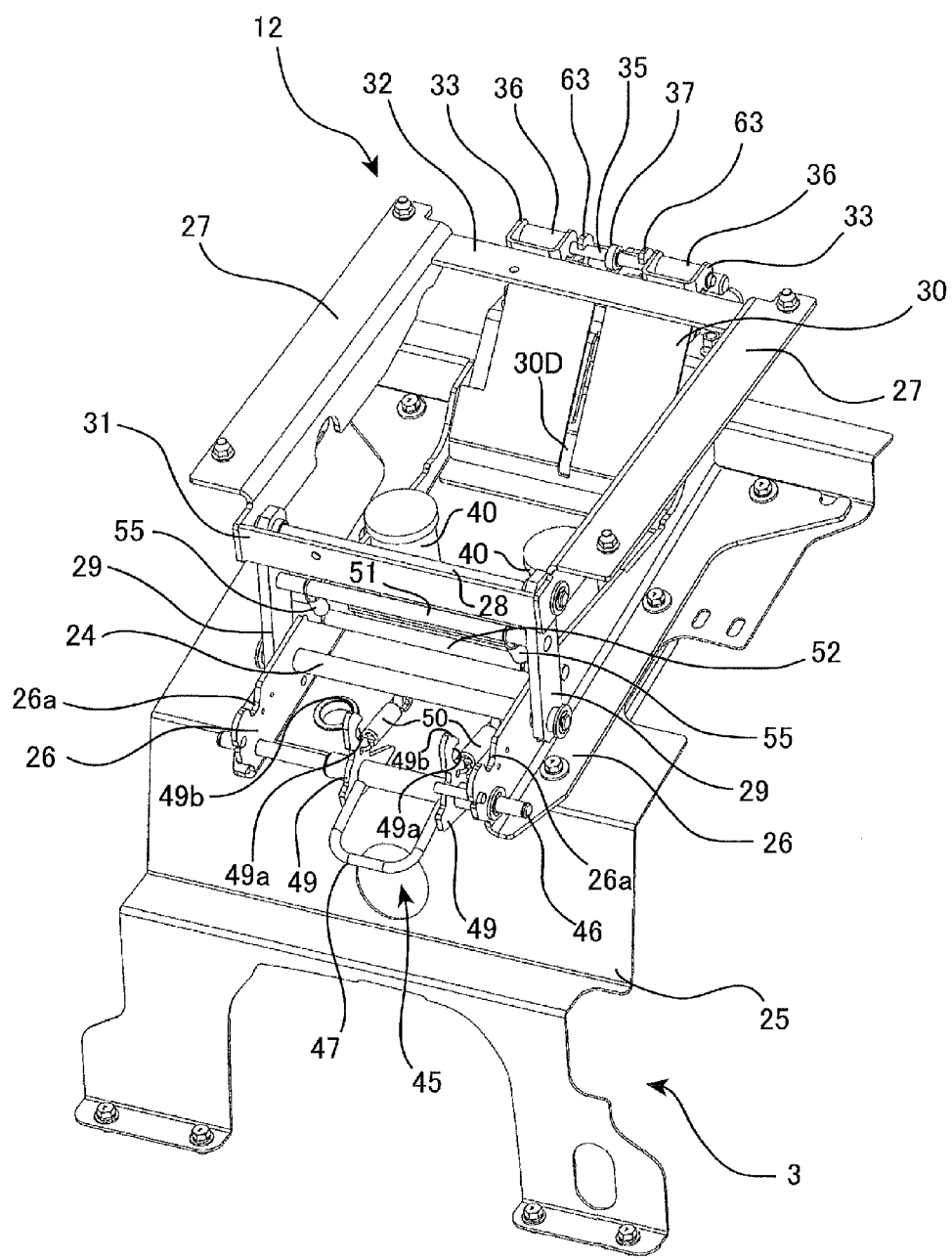
FIG. 6 is a perspective view showing the configuration of the supporting unit of the seat held at a rear upper position of the vehicle.

As shown in FIGS. 5 and 6, the supporting unit 12 is disposed between a driver's seat outer cover 25 which is fixed to the travel body 3 and composes a part of the travel body 3 and the supporting base 13 that turnably supports the swivel base 15. The supporting unit 12 includes a pair of seat frames 26 that is fixed to the travel body 3 (body) of the tractor 100 covered by the driver's seat outer cover 25 and extend in the front-back direction, a pair of seat brackets 27 that is fixed to the supporting base 13 for mounting the seat 5 and extend in the front-back direction, a pair of right and left arm members 29 whose lower ends are turnably connected to front ends of the seat frames 26 and whose upper ends are connected to front ends of the seat brackets 27, respectively, and an inclined plate 30 provided at the rear end side of the seat frames 26. The both ends of the arm members 29 are connected to lower and upper shafts 24 and 28 bridged over the right and left seat frames 26 and seat brackets 27, respectively, and the arm members 29 support the front parts of the seat brackets 27 rockably with respect to the seat frames 26 between the front lower position and the rear upper position.

The front and rear parts of the right and left seat brackets 27 are connected by connecting plates 31 and 32, respectively. The rear connecting plate 32 supports a shaft 35 by brackets 33. The shaft 35 rotatably supports a pair of right and left rollers 36 made of an elastic member such as rubber and an arm (fall preventing member) 37 at its center part while setting an edge portion of the arm as a free end. The inclined plate 30 is disposed such that a lower end part thereof is fixed in a body with the driver's seat outer cover 25 at part between the rear parts of the right and left seat frames 26 and such that the inclined plate 30 extends aslant obliquely upward in the rear direction. Specifically, as shown in detail in FIG. 7, the lower part (lower position) of the inclined plate 30 is formed to be a rise portion 30A having a large inclination in order to acquire a marginal space for the supporting unit 12 in the front lower position, and an upper part thereof is formed to be a guide portion 30B having a loose inclination to smoothly guide the rollers 36 to higher position on the rear side. An upper end portion (upper position) of the inclined plate 30 extends substantially in a horizontal direction toward the rear direction and is formed to be a supporting portion 30C that carries and supports the rollers 36 in the rear upper position.

The inclined plate 30 is provided with a slit 30D that extends in an up-down (front-rear) direction, i.e in a direction in which the roller 36 moves at a lateral center part thereof. The arm 37 is fittingly inserted into the slit 30D. The arm 37 is provided with a pin 39 such as a roll pin fixed by penetrating through the edge portion, i.e., the free end, of the arm 37 in the lateral direction. The arm 37, i.e., the fall preventing member, that is stopped from being pulled out of the slit 30D by the pin 39 prevents the rear end portion of the supporting unit 12 from getting out of the inclined plate 30 and the seat from falling down to the front side. It is noted that an E-ring may be used for the shaft 35 to prevent lateral swing of the arm 37.

Two suspension springs (anti-vibration members) 40 composed of two coil springs are provided laterally on the driver's seat outer cover 25 at the front part of the inclined plate 30 between the right and left seat frames 26. These suspension springs 40 elastically suspend the seat by abutting the rear part of the supporting base 13 in the condition in which the seat 5 is held in the front lower position. Although the lower ends of the suspension springs 40 are fixed to the driver's seat outer cover 25, a plate supporting the lower ends of these suspension springs 40 may be provided to be movable in the front-back direction of the body with respect to the driver's seat outer cover 25 so as to be able to change a suspension load of the seat by adjusting the position of the springs in the front-back direction. The suspension springs 40 may be also arranged such that one ends thereof are fixed to the supporting base 13 and the other ends abut the driver's seat outer cover 25 in the condition in which the seat 5 is held in the front lower position.

The front parts of the seat brackets 27, i.e., the seat supporting portions, are rockably supported by the arm members 29 with respect to the seat frames 26, i.e., the fixed members, and the rollers 36 are guided on the inclined plate 30 at the rear part of the seat brackets 27. Therefore, the supporting unit 12 is movable between the front lower position and the rear upper position, and is fixed and held in the front lower position by a front lower position locking mechanism 45 and in the rear upper position by a rear upper position locking mechanism 60.

As shown in FIGS. 5 through 8, the front lower position locking mechanism 45 has a manipulation shaft 46 that is rotatably supported by the front part of the right and left seat frames 26. The manipulation shaft 46 is provided with a U-like manipulation lever 47 that is fixed thereto and projects forward at a center part of the manipulation shaft 46 and a pair of hooks 49 that is fixed thereto and project upwardly at right and left parts of the manipulation shaft 46. Springs 50 are provided in tension between the hooks 49 and the lower shaft 24 described above. The springs 50 are biased in a direction in which engaging portions 49a of the hooks 49 approach the lower shaft 24. The hooks 49 have edge portions 49b each having an inclined surface. An intermediate shaft 51 is bridged over intermediate portions of the right and left arm members 29. The intermediate shaft 51 is a member to be engaged with the engaging portions 49a of the hooks 49.

When the supporting unit 12 falls forward to the front lower position, the intermediate shaft 51 abuts the edge portions 49b of the hooks 49 and turns the hooks 49 by resisting against the springs 50. Then, in a condition in which the intermediate shaft 51 passes through the edge portion 49b, the hooks 49 turn by the springs 50 and engage the intermediate shaft 51 with the engage portions 49a. Therefore, when the operator sits down the seat 5 in the state in which the supporting unit 12 is moved to the front lower position, the front lower position locking mechanism 45 is automatically locked. In this state, the arm member 29 falls down to the front side, and the intermediate shaft 51 is supported by concave portions 26a formed on the right and left seat frames 26 and is engaged and held by the engage portions 49a of the hooks 49 as shown in FIG. 5. Then, the seat brackets 27, i.e., the seat 5, becomes turnable centering on the upper shaft 28. Then, the suspension springs 40 abuts the rear portion of the seat and elastically support the operator sitting on the seat.

Springs 55 are provided in tension between the rear shaft 52 bridged over the right and left seat frames 26 behind the lower shaft 24 and the intermediate shaft 51. These springs 55 urge the arm members 29 in a seat rising direction by resisting against the gravity thereof.

Therefore, when the operator manipulates the manipulation lever 47 downward while rising from the condition in which the operator sits on the seat 5 while facing forward or while standing on the side of the traveling working machine, the hooks 49 turn by resisting against the springs 50 and unlock the intermediate shaft 51. Thereby, the springs 55 raise the seat 5 upward by resisting against the weight of the seat 5 and help the operator in moving the seat. Then the supporting unit 12 moves the seat from the front lower position to the rear upper position.

Figure 7:
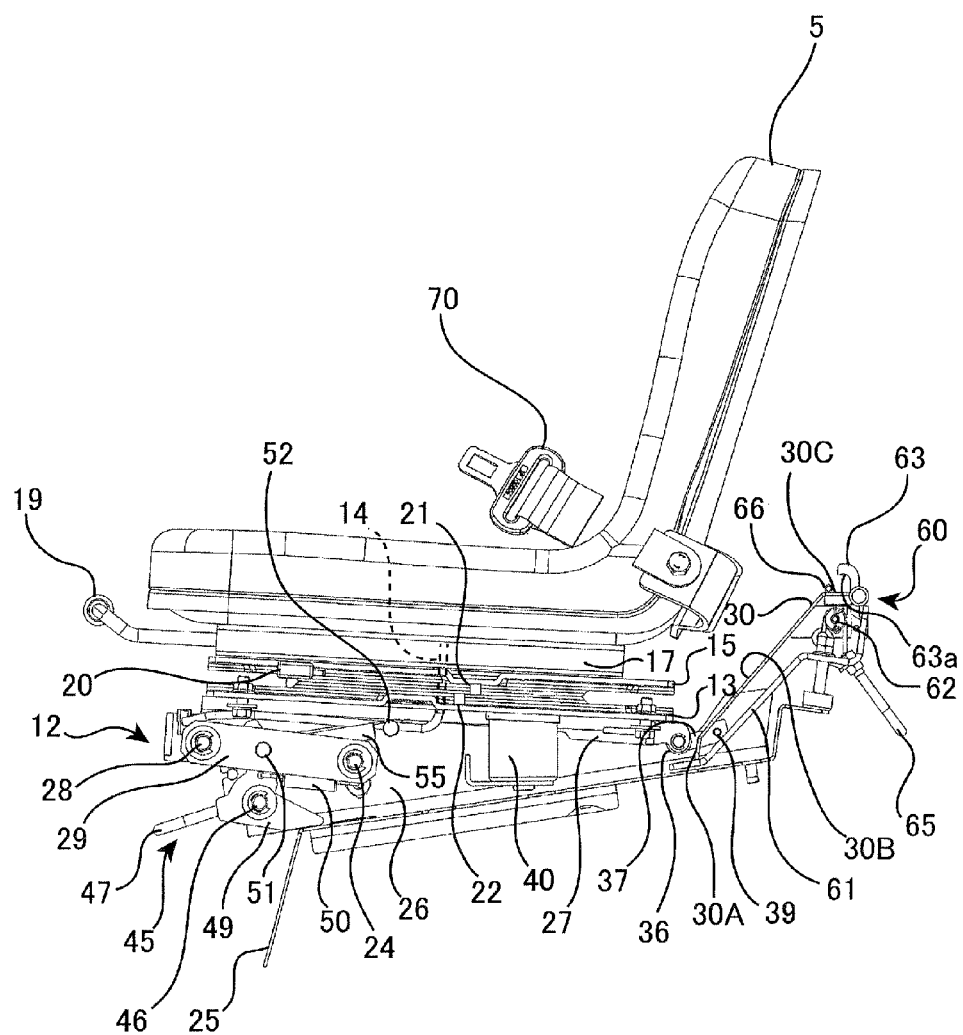
FIG. 7 is a side view showing the supporting unit in a condition in which a load acts on the seat at the front lower position.
Figure 8:
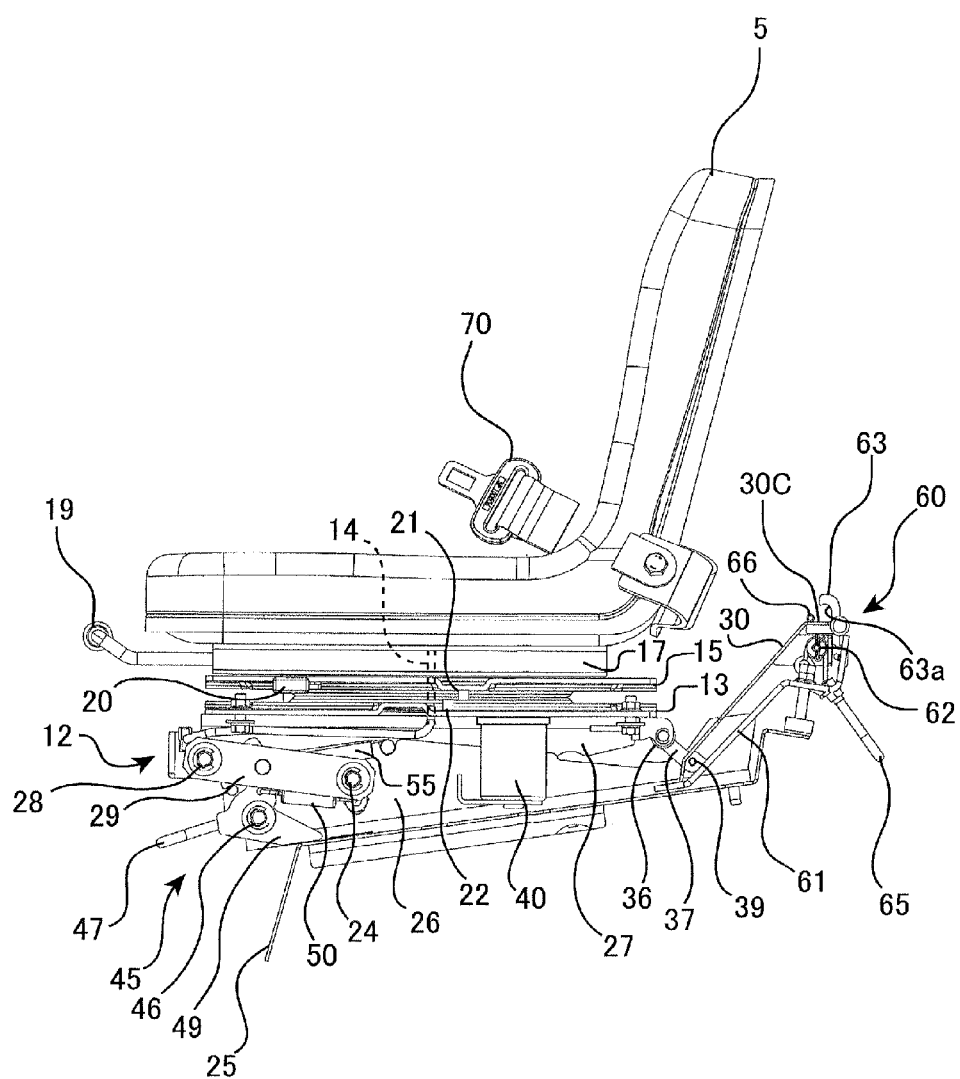
FIG. 8 is a side view showing the supporting unit in a state in which no load acts on the seat at the front lower position.
Figure 9:
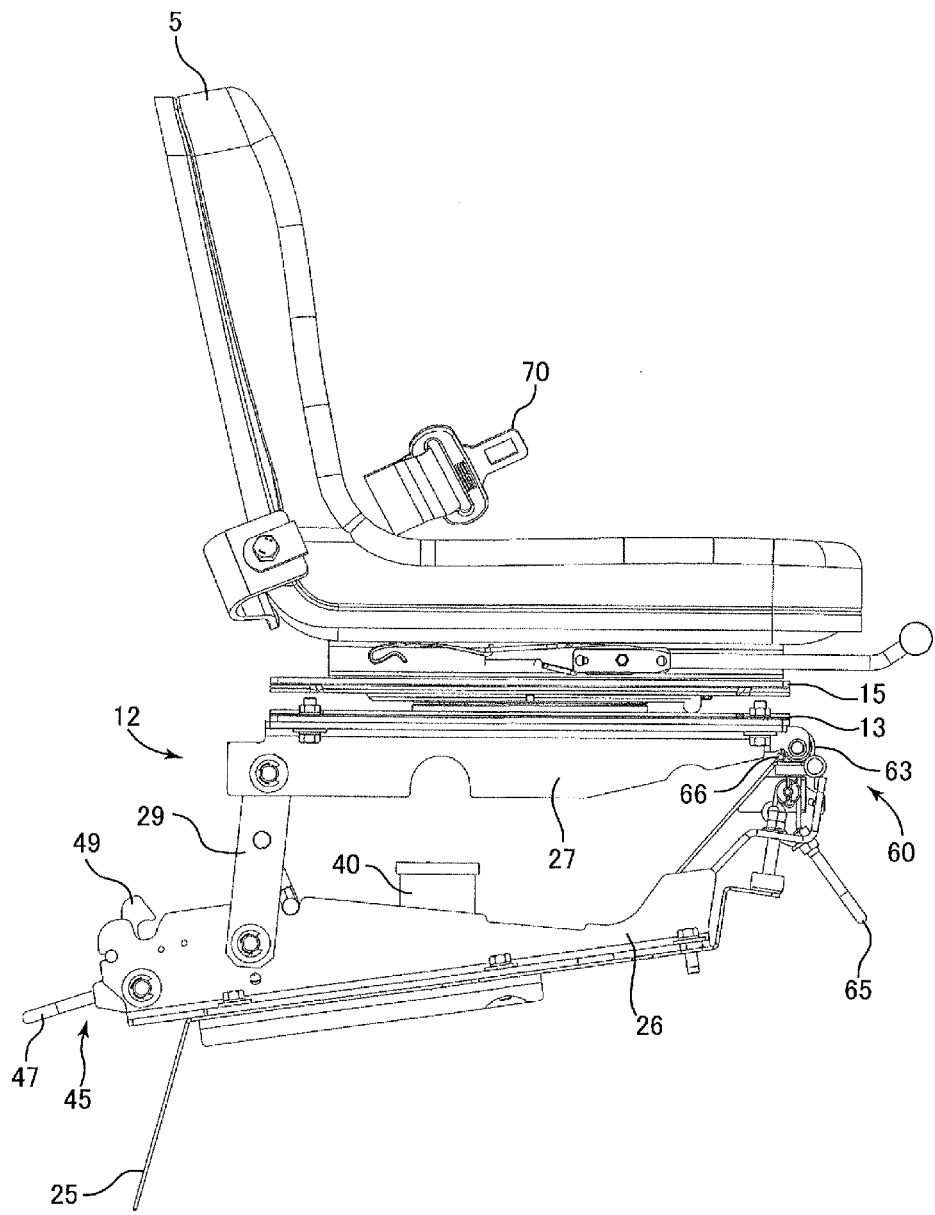
FIG. 9 is a side view showing the seat and the seat supporting unit of the seat and the seat is held at the rear upper position.

As shown in FIGS. 7 and 8, the rear upper position locking mechanism 60 is disposed on a back of the inclined plate 30 and is provided on a back plate 61 which is a reinforcing member for fixing the inclined plate 30 integrally with the driver's seat outer cover 25. The inclined plate 30 integrated with the back plate 61 supports a manipulation shaft 62 through an intermediary of brackets. The manipulation shaft 62 rotatably supports a pair of right and left hooks 63 at its center part and a U-shaped manipulation lever 65 at a center part between the hooks 63. These hooks 63 and the manipulation lever 65 are fixed from each other and rotate in a body. The hooks 63 have an engage portion 63a having a shape capable of engaging with the shaft 35 that supports the rollers 36 and have a pipe member 66 that holds the rollers 36 in the rear upper position in which the engage portion 63a is engaged with the shaft 35 at the support portion 30C of the inclined plate 30.

When the supporting unit 12 is moved toward the rear upper position, the rollers 36 are moved obliquely upward by being guided by the guide portion 30B of the inclined plate 30. Then, when the rollers 36 reach the support portion 30C of the inclined plate 30, the rollers 36 ride over the pipe member 66 and the engage portion 63a receives the shaft 35. The engage portion 63a engages and holds the shaft 35, i.e., the rear end portion of the supporting unit 12, when the seat 5 is moved to the rear upper position. In this state, the rollers 36 are held by the support portion 30C of the inclined plate 30 and the supporting unit 12, i.e., the seat 5, is held in the rear upper position.

When the supporting unit 12 is moved from the rear upper position to the front lower position, the operator manipulates the manipulation lever 65 downward on the side of the travel body 3. Then, the hook 63 turns and unlocks the shaft 35. When the seat 5 is moved to the front lower position in this condition, the rollers 36 move to the front lower position by being guided by the inclined plate 30.

Since the working vehicle (tractor) is arranged as described above, the seat 5 is in the front-facing position and the front lower position in driving the tractor 100 or in operation such as cultivation. The right and left arm members 29 of the supporting unit 12 fall forward in the front lower position (see FIGS. 4, 7 and 8) and the intermediate shaft 51 attached to the right and left arm members 29 is fitted into the concave portions 26a formed on the seat frame 26 and is engaged with the hooks 49. The front end sides of the seat brackets 27 are in a condition of being pivoted by the seat frame 26 by the upper shaft 28 as an axis. The supporting base 13 supported by the seat brackets 27 abuts and is supported by the suspension springs 40. The rollers 36 are located at the lower position of the inclined plate 30 and are separated from the inclined plate 30. The rear end side of the seat bracket 27 is in a state of a free end. With this arrangement, it is possible to simplify the structure of the suspension for supporting the seat 5 and to directly support the rear end side of the seat bracket 27. Therefore, it is possible to alleviate fatigue of the operator by suppressing vibrations otherwise propagated to the seat 5 by directly supporting the rear end sides of the seat brackets 27 by the suspension springs 40. When the seat brackets 27 are held in the front lower position, the rollers 36 provided in the seat brackets 27 are separated from the inclined plate 30, so that it is possible to directly support the rear end side of the seat brackets 27 readily and steadily by the anti-vibration members.

It is noted that since the suspension having the same structure may be applied also to a tractor equipped with a non-rotatable seat, there is such merit that it is not necessary to design a new suspension, allowing a production cost to be suppressed for example.

While the operator has a head forward posture in driving and operating the tractor 100 while sitting on the seat 5, the operator can operate in a comfortable position by tilting the seat 5 forward in a range in which the pin 39 at the front end portion of the arm 37 is stopped as shown in FIG. 8. Even if the operator applies forward an excessive load to the front or a moment in a forward falling direction acts on the seat 5 centering on the upper shaft 28 as forward inertia acts from a seat belt 70 due to the operator, the seat 5 is blocked from falling down in the front side as the stopper pin 39 provided at the edge of the arm 37 is hooked by the slit 30D of the inclined plate 30.

When the operator operates the backhoe not shown attached to the rear part of the body, the operator operates the backhoe while looking behind the vehicle after stopping the tractor 100 at a working position. At this time, the operator moves the seat 5 to the rear upper position and turn to the back-facing position.

Then the operator manipulates the manipulation lever 47 of the front lower position locking mechanism 45 to move the seat 5 from the front lower position to the rear upper position. As the operator operates the manipulation lever 47, the right and left hooks 49 turn and unlock the intermediate shaft 51. The intermediate shaft 51 moves toward the rear shaft 52 by the biasing force of the springs 55 when it is unlocked from the hooks 49. As the intermediate shaft 51 moves, the right and left arm members 29 rise upward and the rollers 36 moves on the guide portion 30B of the inclined plate 30 from the lower position to the upper position of the inclined plate 30. At this time, the arm 37 moves upward within the slit 30D as the rollers 36 move.

When the rollers 36 move to the support portion 30C, the shaft 35 is engaged with the engage portions 63a of the hooks 63, the rollers 36 are held by the support portion 30C and the seat bracket 27 is held in the rear upper position. Then, the operator manipulates the unlocking lever 20 from the left side of the travel body 3 in this state to unlock the seat 5 and turns the seat 5 such that the seat surface thereof faces in a front direction of the operator and such that the seat is positioned in the back-facing position by turning by 180 degrees. Then, the restricting member 21 provided in the swivel base 15 abuts one of the two abutting members 22 provided on the supporting base 13, so that the seat 5 is positioned. When the operator manipulates the unlocking lever 20 or the seat 5 is automatically locked in this state, the seat 5 is put into the state shown in FIG. 3 or 8. The operator sits on the seat 5 and operates the backhoe in this state.

Still further, when the seat 5 is to be moved from the back-facing and rear upper positions to the front-facing and the front lower positions, the operator stands on the left side of the travel body 3 in the same manner and manipulates the unlocking lever 20 in the state in which the supporting unit 12 is in the rear upper position to turn the seat 5. At this time, the seat 5 can turn only in the direction in which the seat surface faces in the front direction due to the abutment of the restricting member 21 with one of the abutting member 22, so that the seat 5 is turned with the same turn range and is locked in the front-facing position in which the restricting member 21 abuts the other abutting member 22.

Therefore, the seat 5 turns in the state in which the supporting unit 12 is in the rear upper position and with the same turning range, so that the seat 5 itself, the parts of the slide lever 19, the seat belt 70 and others do not butt the manipulation levers 6, 9 and others disposed on the travel body 3, the seat turning operation can be carried out readily without erroneously manipulating the manipulation levers, and the degree of freedom of design of the seat and peripheral parts can be improved. That is, because the turning range of the seat 5 with respect to the body 3 is restricted to be 180 degrees, wires of a seat switch and others led from the seat 5 to the travel body 3 will not be twisted more than 180 degrees. The turning directions of the seat 5 from the front-facing position to the back-facing position and from the back-facing position to the front-facing position are also restricted, respectively, so that it is possible to avoid the parts of the seat 5 from contacting the peripheral parts and to prevent the erroneous manipulation of the manipulation levers as described above. It is also possible to increase a degree of freedom of design such as disposition of the seat and the peripheral parts.

Then, in the state in which the seat 5 is locked in the front-facing position, the operator manipulates the manipulation lever 65 to unlock the rear upper position locking mechanism 60 and to cause a manipulated force to act on the lower front side of the seat 5 to move the supporting unit 12 to the front lower position. Thereby, the arm members 29 start to fall down to the front side and the rollers 36 move to the lower front side by being guided by the guide portion 30B of the inclined plate 30. At this time, because the stop pin 39 is attached to the edge of the arm 37 that moves within the slit 30D as the rollers 36 move, the stop pin 39 prevents the seat 5 from falling down to the front side. Due to that, the seat 5 is movable smoothly between the rear upper position and the front lower position without falling down toward the front side.

When the seat moves toward the front lower side and the intermediate shaft 51 is locked automatically to the hocks 49 by the edge portions 49b thereof and the springs 50, the supporting unit 12 is positioned and held at the front lower position by the front lower position locking mechanism 45.

Accordingly, when the supporting unit 12 is moved to the front lower position, the front lower position locking mechanism 45 is automatically locked without manipulating the manipulation lever 47 by pressing down the seat 5 fixed in the front-facing direction from the above thereof. Even when the engagement of the hooks 49 is incomplete, the hooks 49 steadily lock the intermediate shaft 51 when the operator sits on the seat 5.

Since the manipulation lever 47 of the front lower position locking mechanism 45 and the manipulation lever 65 of the rear upper position locking mechanism 60 are both located at the center in the lateral direction of the supporting unit 12 and are formed into the U-shape, the operator can manipulate them readily from either side of the right and left sides of the travel body 3. Still further, since the both manipulation levers 47 and 65 are disposed at the positions close to the seat 5, the operator can readily manipulate them even while sitting on the seat.

Since the inclined plate 30 is provided at the rear end of the seat frames 26 and the rear connecting plate 32 is provided with the rollers 36 that move on the inclined plate 30 such that the seat brackets 27 move between the front lower position and the rear upper position as these rollers 36 move on the inclined plate 30 as described above, it is possible to create a space on the rear side of the supporting unit 12 while supporting the seat 5 movably in the up-down and front-back directions. With this arrangement, it is possible to utilize the space behind the seat 5 by providing a hydraulic case not shown behind the inclined plate 30 for example. Still further, because the rollers 36 that support the seat brackets 27 on the rear side are composed of the elastic member such as rubber, it is possible to improve seat comfortability when the operator sits on the seat 5.

It is noted that while the abovementioned embodiment of the invention is applied to the tractor and the seat takes the front lower position in the front-facing position and the rear upper position in the back-facing position, the embodiment of the invention is not limited to such arrangement and may be equally applicable to such other embodiment that just turns the seat.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-017008, 2012-017009, and 2012-151856, filed respectively on Jan. 30, 2012, Jan. 30, 2012, and Jul. 5, 2012 which are hereby incorporated by reference herein in their entirety.

What is claimed is:

1. A working vehicle, comprising:
a body;
a seat bracket;
a seat frame fixed to the body;
an arm member connected such that a lower end thereof is turnably connected to a front end side of the seat frame and an upper end thereof is turnably connected to a front end side of the seat bracket;
an inclined plate provided at a rear end side of the seat frame and inclined obliquely upward in a rear direction;
a roller disposed at a rear end portion of the seat bracket and movable on the inclined plate;
a seat mounted on the seat bracket, and the seat supported movably between a front lower position in which the arm member falls forward and the roller moves to a lower position of the inclined plate and a rear upper position in which the arm member erects upward and the roller moves to an upper position of the inclined plate, and being held in the front lower position and the rear upper position; and
a swivel mechanism configured to support the seat rotatably such that the seat faces in front and back directions of the vehicle.

2. The working vehicle according to claim 1, further comprising a fall preventing member connected to the rear end portion of the seat bracket and stopped through a slit formed in the inclined plate such that the slit extends in a direction in which the roller moves to prevent the seat bracket held in the front lower position from falling forward.

3. The working vehicle according to claim 1, wherein the roller is formed of an elastic member; and
the roller supports the seat bracket with elasticity thereof at the upper position of the inclined plate where the roller rides over the plate when the seat is held in the rear upper position.

4. The working vehicle according to claim 1, wherein the swivel mechanism is disposed between the seat and the seat bracket, the working vehicle further comprising:
an anti-vibration member that is disposed at either one of the body and the swivel mechanism and that is in contact with the other one of them in a condition in which the seat is locked in the front lower position;
a front lower position locking mechanism configured to fix the seat bracket to the seat frame at a position where the arm member fall forward; and
a rear upper position locking mechanism configured to fix the seat bracket to the seat frame at a position where the roller is in the upper position of the inclined plate;
wherein the seat bracket is pivotably supported to the seat frame by the front end side thereof, and the rear end side thereof is in a free end condition and is supported by the anti-vibration member in a condition in which the seat bracket is held by the front lower position locking mechanism.

5. The working vehicle according to claim 4, wherein the seat bracket is supported by the anti-vibration member and the roller is separated from the inclined plate in the condition in which the seat bracket is held by the front lower position locking mechanism.

6. The working vehicle according to claim 1, wherein the swivel mechanism comprises:
a supporting base attached to the seat bracket;
a swivel base that supports the seat rotatably on the supporting base by a vertical shaft;
one restricting member fixed to either one of the supporting base and the swivel base; and
a pair of abutting members fixed to the other one of the supporting base and the swivel base on an opposite side interposing the vertical shaft;
wherein a rotational range of the seat is restricted to be 180 degrees by abutting the restricting member with either one of the pair of abutting members.

* * * * *